US008855036B2

(12) United States Patent
Sabat et al.

(10) Patent No.: US 8,855,036 B2
(45) Date of Patent: Oct. 7, 2014

(54) DIGITAL DISTRIBUTED ANTENNA SYSTEM (75) Inventors: John Sabat, Merrimack, NJ (US); David Porte, Driftwood, TX (US)

(73) Assignee: Powerwave Technologies S.a.r.l., Luxembourg (LU)

( * ) Notice: Subject to any disclaimer, the term of this patent is extended or adjusted under 35 U.S.C. 154(b) by 981 days.

(21) Appl. No.: 12/340,383

(22) Filed: Dec. 19, 2008

(65) Prior Publication Data
US 2009/0180426 A1    Jul. 16, 2009

Related U.S. Application Data (60) Provisional application No. 61/008,763, filed on Dec. 21, 2007.

(51) Int. Cl.
H04H 20/71    (2008.01)
H04W 4/00    (2009.01)
H04B 7/14    (2006.01)
H04J 1/10    (2006.01)
H04J 3/08    (2006.01)
H04W 88/08    (2009.01)

(52) U.S. Cl.
CPC ................................. H04W 88/085 (2013.01)
USPC ............................ 370/312; 370/315; 370/328

(58) Field of Classification Search
USPC .......................................................... 370/312
See application file for complete search history.

(56) References Cited

U.S. PATENT DOCUMENTS

| 5,280,472 | A |  | 1/1994 | Gilhousen et al. |
| 5,479,409 | A |  | 12/1995 | Dupuy et al. |
| 5,513,176 | A |  | 4/1996 | Dean et al. |
| 5,533,011 | A |  | 7/1996 | Dean et al. |
| 5,627,879 | A |  | 5/1997 | Russell et al. |
| 5,644,622 | A |  | 7/1997 | Russell et al. |
| 5,657,374 | A |  | 8/1997 | Russell et al. |
| 5,867,485 | A | * | 2/1999 | Chambers et al. ............ 370/281 |
| 6,560,441 | B1 |  | 5/2003 | Sabat, Jr. et al. |
| 6,665,289 | B1 |  | 12/2003 | Sebire et al. |
| 6,963,552 | B2 |  | 11/2005 | Sabat, Jr. et al. |
| 7,031,295 | B2 |  | 4/2006 | Schafer |
| 7,039,399 | B2 |  | 5/2006 | Fischer |
| 7,065,779 | B1 | * | 6/2006 | Crocker et al. ............... 725/111 |
| 2001/0010490 | A1 | * | 8/2001 | Bellin ............................ 370/310 |
| 2001/0036163 | A1 | * | 11/2001 | Sabat et al. ................... 370/328 |
| 2001/0037395 | A1 |  | 11/2001 | Sabat, Jr. et al. |
| 2002/0003645 | A1 |  | 1/2002 | Kim et al. |

(Continued)

OTHER PUBLICATIONS

Office Action dated Aug. 3, 2010 from U.S. Appl. No. 12/340,401.

(Continued)

Primary Examiner — Jenee Williams
(74) Attorney, Agent, or Firm — Caseiro Burke LLC; Chris A. Caseiro (57) ABSTRACT A digital distributed antenna system (DDAS) that regains the capability to perform simulcast to multiple simulcast groups while using a base station's direct digital output is provided. The User Plane data is adapted for simulcast and also for eliminating time delay ambiguities across multiple simulcast digital radios. In addition, the Control and Management Plane is aggregated across multiple remote units to allow a non-modified donor digital base station to control simulcast groups. The result is a low cost digital DAS that can efficiently distribute the capacity of a digital base station to solve coverage and capacity requirements in a manner similar to that now accomplished using a traditional base station with RF in/out.

15 Claims, 6 Drawing Sheets

(56) References Cited

U.S. PATENT DOCUMENTS

| | | | |
|---|---|---|---|
| 2002/0075906 A1* | 6/2002 | Cole et al. | 370/535 |
| 2002/0136185 A1* | 9/2002 | Dajer et al. | 370/326 |
| 2002/0136231 A1* | 9/2002 | Leatherbury et al. | 370/442 |
| 2002/0186674 A1* | 12/2002 | Mani et al. | 370/328 |
| 2003/0014763 A1* | 1/2003 | Chappell et al. | 725/111 |
| 2003/0142622 A1* | 7/2003 | Kaku et al. | 370/208 |
| 2003/0142692 A1* | 7/2003 | Shimada | 370/442 |
| 2004/0023651 A1* | 2/2004 | Gollnick et al. | 455/423 |
| 2004/0096222 A1 | 5/2004 | Cagenius | |
| 2004/0106435 A1 | 6/2004 | Bauman et al. | |
| 2005/0063324 A1* | 3/2005 | O'Neill et al. | 370/310 |
| 2005/0114903 A1* | 5/2005 | Ahmed et al. | 725/114 |
| 2005/0243785 A1* | 11/2005 | Sabat et al. | 370/338 |
| 2006/0023675 A1* | 2/2006 | Karaoguz et al. | 370/338 |
| 2006/0034335 A1* | 2/2006 | Karaoguz et al. | 370/477 |
| 2006/0094470 A1* | 5/2006 | Wake et al. | 455/560 |
| 2006/0153147 A1 | 7/2006 | Chillariga et al. | |
| 2007/0147277 A1* | 6/2007 | Caromel et al. | 370/315 |
| 2007/0147278 A1* | 6/2007 | Millar | 370/315 |
| 2007/0230382 A1* | 10/2007 | Ding et al. | 370/310 |
| 2007/0293157 A1 | 12/2007 | Haartsen et al. | |
| 2008/0062906 A1* | 3/2008 | Baker et al. | 370/315 |
| 2008/0145056 A1 | 6/2008 | Boldi et al. | |
| 2008/0259826 A1 | 10/2008 | Struhsaker | |
| 2008/0259839 A1* | 10/2008 | Tang et al. | 370/312 |
| 2009/0247241 A1* | 10/2009 | Gollnick et al. | 370/311 |
| 2009/0252206 A1 | 10/2009 | Rheinfelder et al. | |

OTHER PUBLICATIONS

Office Action dated Apr. 8, 2011 from U.S. Appl. No. 12/340,401.
Notice of Allowance dated Jan. 5, 2012 from U.S. Appl. No. 12/340,401.

\* cited by examiner

DIGITAL DISTRIBUTED ANTENNA SYSTEM

RELATED APPLICATION INFORMATION

The present application claims the benefit under 35 USC 119(e) of U.S. provisional patent application Ser. No. 61/008,763 filed Dec. 21, 2007, the disclosure of which is incorporated herein by reference in its entirety.

FIELD OF INVENTION

The present invention relates to wireless communications systems and methods. More specifically, the present invention relates to distributed antenna systems (DAS).

BACKGROUND OF THE INVENTION

Current wireless communications systems are directed to providing RF coverage and/or call capacity so that users may connect to the wireless infrastructure. All solutions rely on some means of distributing RF energy ranging from high power, large coverage area towers to low power in-building pico-cells.

There also exists a class of RF enhancement technologies known as RF repeaters. Some are bidirectional RF amplifiers that retransmit the signals received over the air from a host base station. Others are directly connected to a host base station and distribute the RF signals via either electrical, e.g., coaxial cable, or optical fiber distribution networks. In many cases the signals from a base station can be distributed to multiple antenna sites with a means called simulcast.

More specifically, Distributed Antenna Systems are used to provide wireless communications coverage where it is impractical to install a conventional base station. An example is in-building coverage where low cost radiating antennas are desired and base stations represent either too large or too expensive a solution. Distributed Antenna Systems allow a donor base station to be located outside the desired coverage area and its RF signals are distributed to multiple antennas using either electrical or optical means. A means to distribute the base station's signals to more than one antenna is termed simulcast. In the direction toward the wireless user, i.e., downlink/forward path, the signal is replicated for each remote location. On the return direction, i.e., uplink/reverse path, the signals from multiple remote locations are summed to create a single composite signal for the base station. For both the base station and the user's device, the multiple copies of the RF signal appears as multipath reflections and is compensated for by the use of equalizers and rake receivers.

Figure 1:
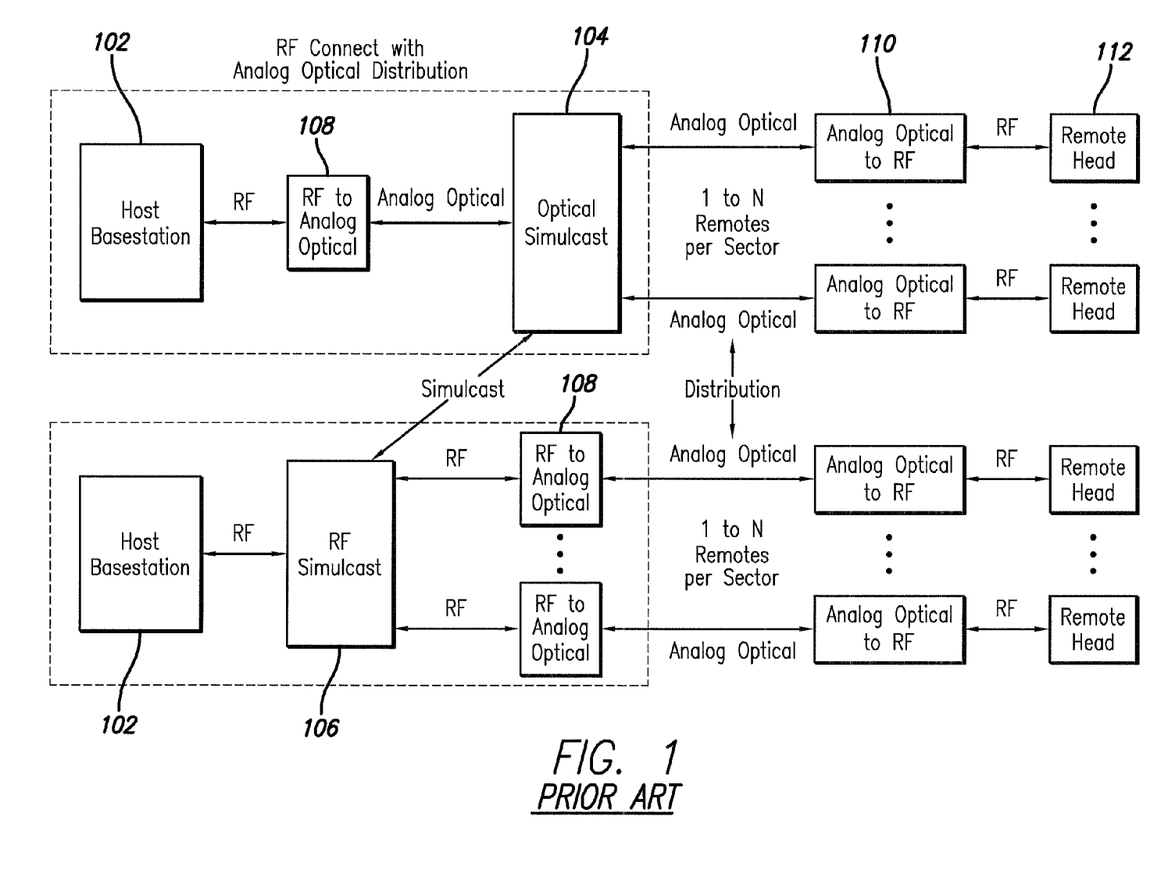
FIG. 1 is a block schematic drawing of a Distributed Antenna System (DAS) having direct RF connection to the donor base station with analog optical distribution to the Remote RF Units.

In FIG. 1 a block schematic drawing of a Distributed Antenna System (DAS) having direct RF connection to the donor base station with analog optical distribution to the Remote RF Units is shown. Simulcast distribution may be performed either in the RF or optical domains.

Figure 2:
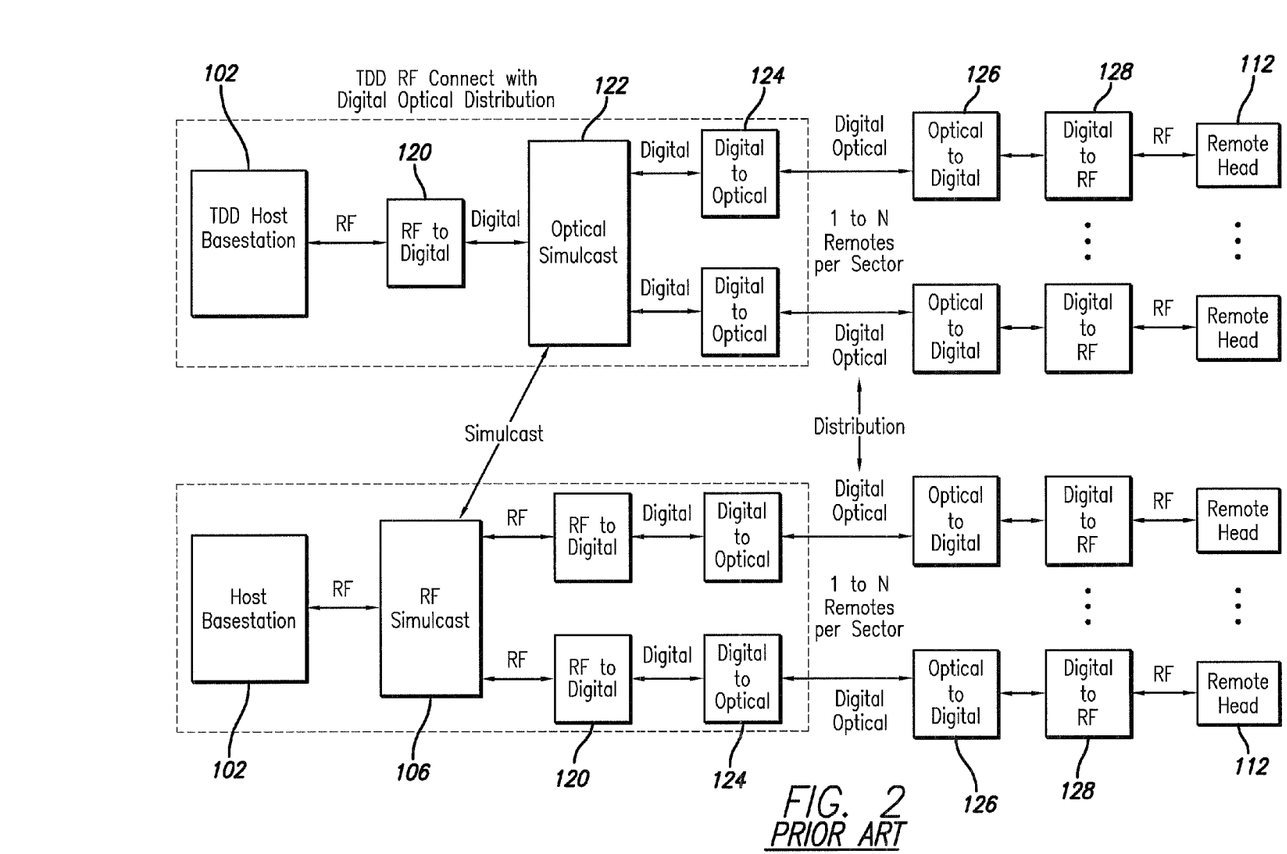
FIG. 2 is a block schematic drawing of a DAS having direct RF connection to the donor base station with digital optical distribution to the Remote RF Units.

In FIG. 2 a block schematic drawing of a DAS having direct RF connection to the donor base station with digital optical distribution to the Remote RF Units is shown. Simulcast distribution may be performed either in the RF or digital electrical domains.

As shown in FIGS. 1 and 2, the current DAS solutions use either analog, i.e., 'RF over fiber'/'Analog DAS', links or sampled digital, i.e., 'digital DAS', links and are based on an analog RF connection to the base station. The DAS signals are fed to one or more RF modules, through a technique called simulcast.

Simulcast is readily accomplished with a base station providing RF inputs and outputs. These techniques are well known to those skilled in the art. Also, for digital distribution, antenna remoting techniques are known to those skilled in the art.

The diagrams show a single base station sector 102, i.e. group of RF carriers, connected to multiple Remote RF Units 110. This is not just a demultiplexing operation where an RF carrier from the host base station is separated for distribution to separate Remote RF Units. All Remote RF Units transmit and receive the same group of RF carriers as the host/donor base station to which they are connected.

The Remote RF Units are at a different geographical location and they provide either widely separated or partially overlapping coverage areas. For the latter a mobile user's radio may receive identical signals from multiple Remote Units and that composite signal will appear as multipath to that wireless device. As long as the time delay differentials from the overlapping signals are less than the multipath design range of the mobile device, the composite signal will be successfully processed.

These same multipath and time delay considerations also apply in the reverse direction where a user's device signal is received by multiple remote units. The multiple received signals are summed within the simulcast hardware of the DAS system to provide a single composite signal to the host donor base station 102. As with the user device (not shown), the base station 102 sets constraints on the amount of time delay differential that can be tolerated on the reverse link.

For a purely analog distribution network, illustrated in FIG. 1, the simulcast can be accomplished through RF splitters on the downlink, and RF summers on the uplink. The same splitting and summing can be accomplished in the analog optical domain, with the requirement that different optical wavelengths be used on the uplink. A digital distribution network, illustrated in FIG. 2, adds the extra steps of Analog-to-Digital and Digital-to-Analog conversions at both ends of the DAS network. As with the analog DAS, a set of RF summers and splitters can perform simulcast prior to conversion to the digital domain. Simulcast can also be implemented in the digital domain prior to conversion to digitally modulated optical signals.

There is now a new class of base stations with digital input and outputs that are meant to be used in conjunction with remote radio equipment to provide installation flexibility. Although these base stations allow the radio equipment to be remotely located from the base station core electronics, they require a one to one correspondence between each digital airlink stream and a remote radio unit. Detailed specifications of two digital base station interfaces are the Common Public Radio Interface (CPRI) and the Open Base Station Architecture Initiative (OBSAI). With this, a wireless coverage system incorporating a large number of remote antennas will require a large number of base stations along with the attendant issues of frequency re-use and wireless handovers as a user's radio moves throughout a coverage area.

SUMMARY OF THE INVENTION

In a first embodiment of the present invention, a digital distributed wireless communication system is provided. The wireless communication system includes a base station providing and receiving a digital multiplexed communication signal, a plurality of remote transceiver units, a digital distributed interface unit coupled to the base station and the plurality of remote transceiver units and providing the digital signal in a 1:N simulcast distribution to, and providing time alignment of the digital multiplexed signals from, the plurality of remote transceiver units.

A plurality of fiber optic digital interface links corresponding to each of the plurality of remote transceiver units, wherein the fiber optic digital interface links provide the digital multiplexed signal to and from the remote transceiver units. The digital distributed interface unit manages a remote digital interface delay to align a plurality of remote digital multiplexed signals from the plurality of remote transceiver units. Each of the plurality of transceiver remote units includes a programmable delay to equalize propagation time to the digital distributed interface unit.

The digital distributed wireless communication system further includes a Control & Management (C&M) processor for processing C&M data plane provided to the plurality of remote transceiver units. The digital distributed interface unit provides control commands to each of the plurality of remote transceiver units. The digital multiplexed communication signal is a Common Public Radio Interface (CPRI) signal. The plurality of remote digital transceiver units are Radio (DDR) units providing an airlink to remote users.

In another aspect of the present invention, a digital distribution communication network, including a host digital base station providing and receiving a digital multiplexed communication signal, a plurality of digital distributed radio (DDR) remotes coupled to receive the digital multiplexed communication signal from the base station, and a DDR Hub configured to provide a 1:N simulcast of the digital multiplexed signal, the DDR Hub coupled to the base station and to each of the plurality of DDR remotes.

The DDR Hub includes a multiplexer coupled to the host digital base station, a plurality of fiber optic digital interface links coupled to a plurality of multiplexers and to each of the corresponding plurality of DDR remotes, and a user plane processor for implementing summation and splitting operations, and providing a programmable delay for providing a common delay value to the digital multiplexed signals to and from the plurality of DDR remotes.

The digital distribution communication further includes a Control and Management (C&M) processor for processing C&M data plane from both the host base station and the plurality of DDR remotes and managing the simulcast distribution of the data plane to the plurality of DDRs. The DDR hub manages a remote digital interface delay to align a plurality of remote digital multiplexed signals from the plurality of DDR remotes.

In still another embodiment of the present invention, a method for providing a digital communication signal between a digital base station and a plurality of remote transceiver units is provided. The method includes providing and receiving a digital multiplexed communication signal at a digital base station via a digital distributed interface unit, and processing the digital multiplexed communication signal for controlled distribution of a 1:N simulcast distribution of the digital multiplexed communication signal to and from a plurality of remote transceiver units, wherein the digital distributed interface unit manages a remote digital interface delay to align a plurality of remote digital multiplexed signals from the plurality of remote transceiver units.

The method further includes coupling the digital multiplexed signals to a plurality of fiber optic digital interface links corresponding to each of the plurality of remote transceiver units and the digital distributed interface unit for providing the simulcast digital multiplexed signal to the remote unit. Each of the plurality of transceiver remote units includes a programmable delay to equalize propagation time to the digital distributed interface unit. The method still further includes processing Control & Management (C&M) data plane from both the digital base station and the plurality of remote transceiver units, and managing the simulcast distribution of the data plane to the plurality of remote transceiver units. Commanding each individual remote digital transceiver unit via a set of remote CPRI commands transmitted via a corresponding fiber optic digital interface link.

DETAILED DESCRIPTION OF THE INVENTION

The invention provides an improved base station system and method of simulcasting a digital multiplexed signal to and from multiple digital radio heads with the necessary synchronization and control aspects to eliminate time delay ambiguities.

Figure 3:
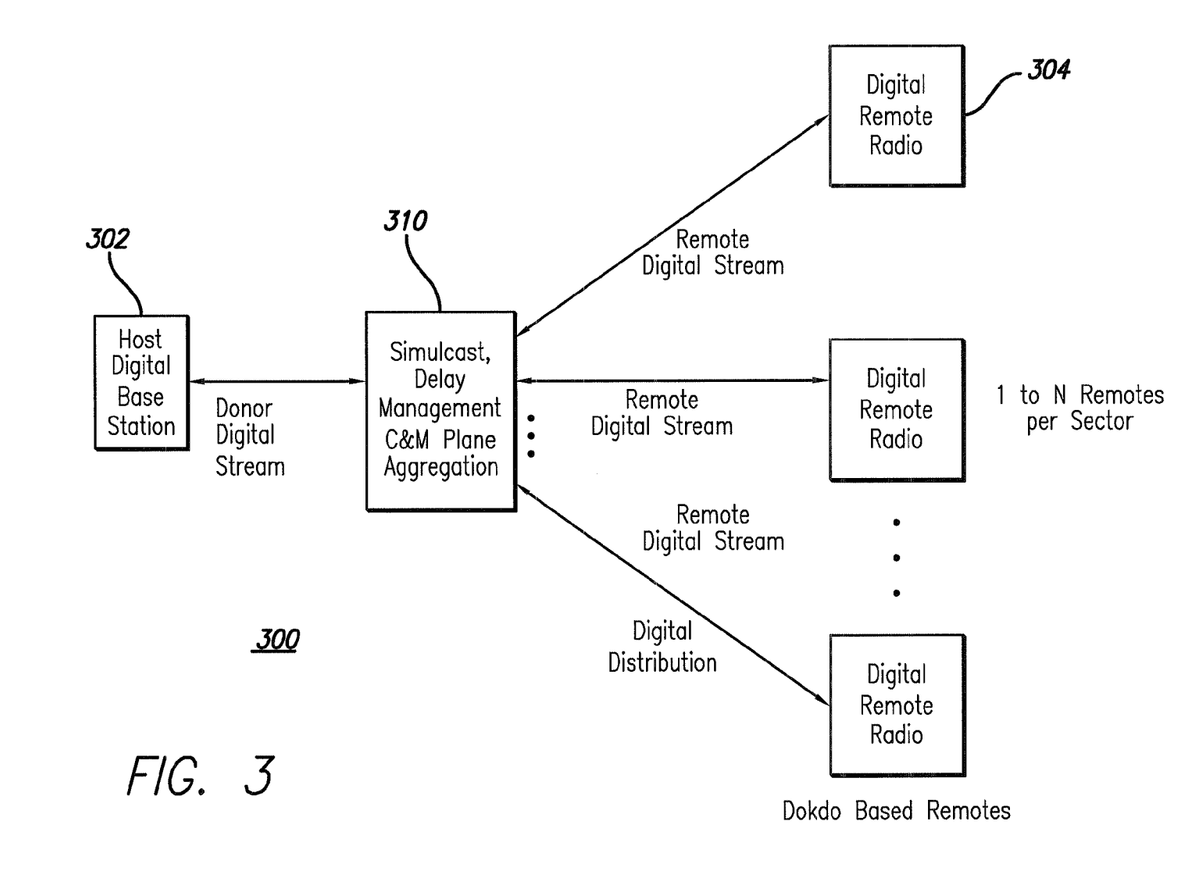
FIG. 3 is a block schematic drawing of a host digital base station and Digital Distributed Radio with direct digital connection to the donor base station with digital distribution to the Digital Remote Radios according to an embodiment of the present invention.

FIG. 3 is a preferred embodiment of the invention illustrating a simple top level diagram of a digital host base station 102 in conjunction with a Distributed Antenna System (DAS) network 300 with simulcast capability.

As shown, FIG. 3 is a block schematic drawing of a host digital base station and Digital Distributed Radio with direct digital connection to and from the donor base station with digital distribution to the Digital Remote Radios. This has a digital multiplexed communication signal with a timing requirement incompatible with conventional simulcast techniques, as discussed above. For this and subsequent diagrams, a specific digital base station interface (CPRI) will be used as an example for labeling and description purposes. However, this could be an OBSAI base station interface.

Accordingly, the Common Public Radio Interface (CPRI) detailed specification Versions 1.4, 2.4, 3.0 and 4.0, hereby incorporated by reference, is directed to the digital base station interface between radio equipment control and radio equipment (www.cpri.info/spec.html). Additionally, the Open Base Station Architecture Initiative (OBSAI) standard for base station interface is hereby incorporated by reference (www.obsai.org).

The base station 302 may be referred to as an REC (Radio Equipment Control). Remote transceiver units 304 will be referred to as the Digital Distributed Radio (DDR) units. The simulcast portion of the network in conjunction with the donor base station is referred to as the DDR Hub 310. Simulcast distribution is performed digitally along with delay management, and control aggregation in the DDR Hub.

Again referring to FIG. 3, the DDR Hub 310 takes Donor CPRI signals from the REC 302 and performs the function of 1:N simulcast on the wireless airlink signal, i.e, the user plane data. The DDR Hub 310 is also responsible for managing the CPRI delay and C&M plane aggregation. Command of each individual DDR 304 is via a set of remote CPRI commands transmitted via a corresponding fiber optic cable 320.

Figure 4:
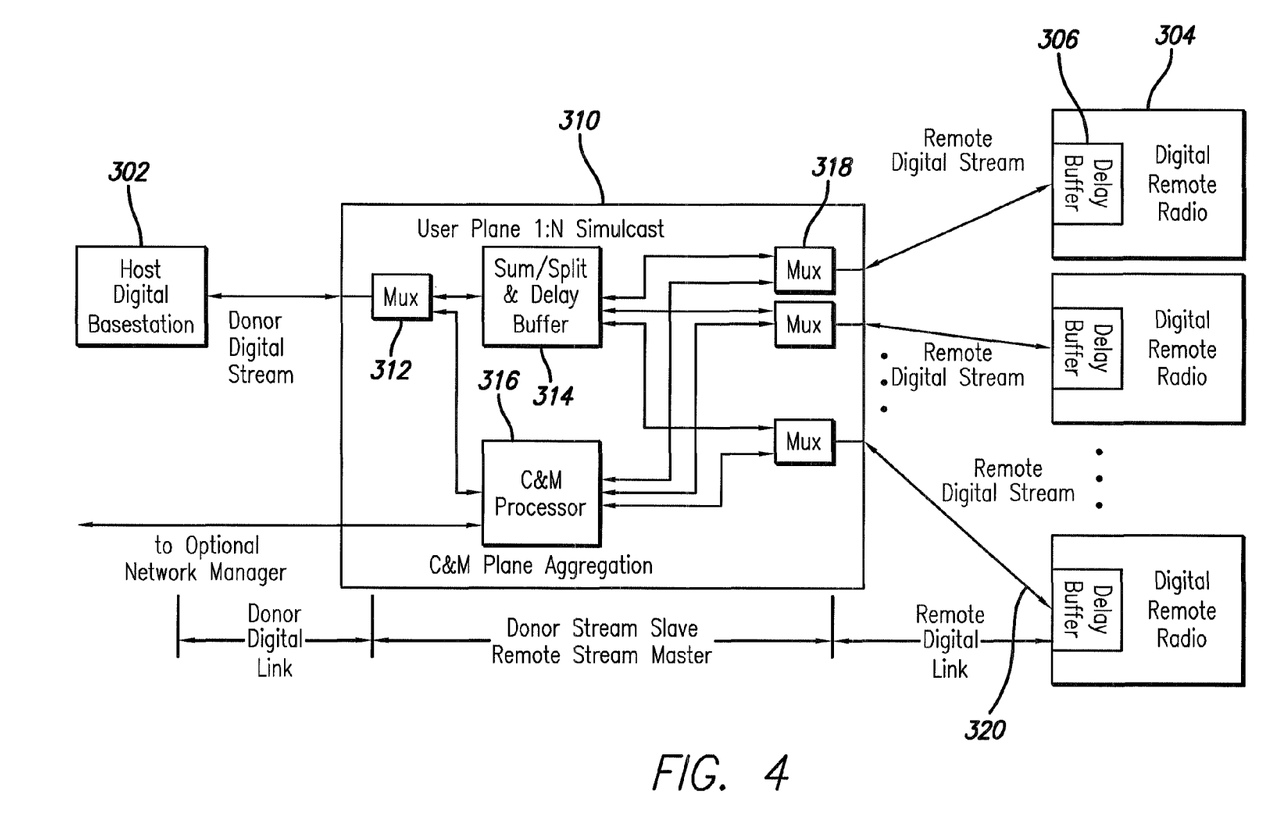
FIG. 4 is a block schematic drawing of a host digital base station and Digital Distributed Radio with a detailed diagram of the Digital Distributed Radio Hubs for a single donor base station configuration.

In FIG. 4, a block schematic drawing of a host digital base station and DDR with a detailed diagram of the DDR Hub is shown for a single donor base station configuration of a preferred embodiment of the present invention.

FIG. 4 provides additional detail for the DDR Hub 310, showing the user plane and C&M plane processing relationships. The user plane is typically implemented in hardware, e.g., an FPGA (field programmable gate array), as a simple duplication and redistribution on the forward link. On the reverse link, an arithmetic summation is used to combine the signals from all simulcasted remote digital radios 304 to provide a single combined reverse-link signal to the REC 302. On both the donor CPRI links and remote side CPRI links 320, the Control and Management (C&M) plane is de-multiplexed/multiplexed for processing in the C&M element processor 316 via multiplexers 312 and 318. Since the host base station 302 and associated CPRI link have no means for control and maintenance for multiple remote digital radios 304 on the control plane, information from all simulcasted remotes 304 is aggregated into a single entity of the entire simulcast group for presentation to the REC 302.

The digital interfaces, i.e., remote side CPRI links 320, have precise accuracy requirements for the propagation delay to the associated remote digital radio 304. A simulcast group, will have different propagation delays due to the differing fiber lengths to each of the DDRs 304. To manage unequal fiber path delays, each DDR 304 incorporates a programmable link delay buffer 306 to equalize propagation time to the DDR Hub 310. Alternatively, the delay buffers 306 may be located within the DDR Hub 310 instead of within each DDR 304. These delay buffers 306 are programmed to provide an equal time delay from all remote DDRs 304 to the central DDR Hub 310.

The donor side digital interface, e.g., CPRI, from the base station cannot be simply duplicated for all simulcasted digital radios 304, since it's not designed for this purpose. Therefore, the donor side CPRI interface connection must be terminated at the DDR Hub 310 and multiple remote side digital CPRI connections 320 must be originated for communication with the DDR remote Units 304. Since the base station 302 uses round trip delay to the remote digital radios 304 to compensate for end-to-end propagation delays, the donor side digital interface in the DDR Hub 310 incorporates a programmable delay buffer in the user plane processor 314 to reflect the common delay value for the digital multiplexed signals from all of the DDR remote units 304.

Alternatively, the host base station 302 can be modified from its standard implementation to accept a time measurement message through the C&M plane to reflect the DDR Hub 310 to the DDR remote 304 propagation delay.

For the C&M plane, the C&M element processor 316 presents a combined view of the DDRs 304 to the REC 302. The C&M element processor 316 must intervene since the C&M plane from the donor base station 302 is unable to individually address, nor recognize the presence of multiple DDRs 304 in a common simulcast. The donor base station 302 operates in a manner consistent with communication and connection to a single remote radio while the C&M element processor 316 manages all aspects of fanning out the control plane to multiple DDRs 304.

Optionally, the C&M element processor 316 can provide a separate IP connection to a separate Network Management System, to provide individual C&M data on each DDR remote unit 304. This permits a connection, which is independent of the donor base station 302 to be provided to the operator of the installation.

In addition to the systems described above, more sophisticated embodiments based around multiple Hubs, or switches, allow expansion and reconfiguration of voice/data capacity, as well as, facilitate the addition of additional remote DDRs to the network.

Figure 5:
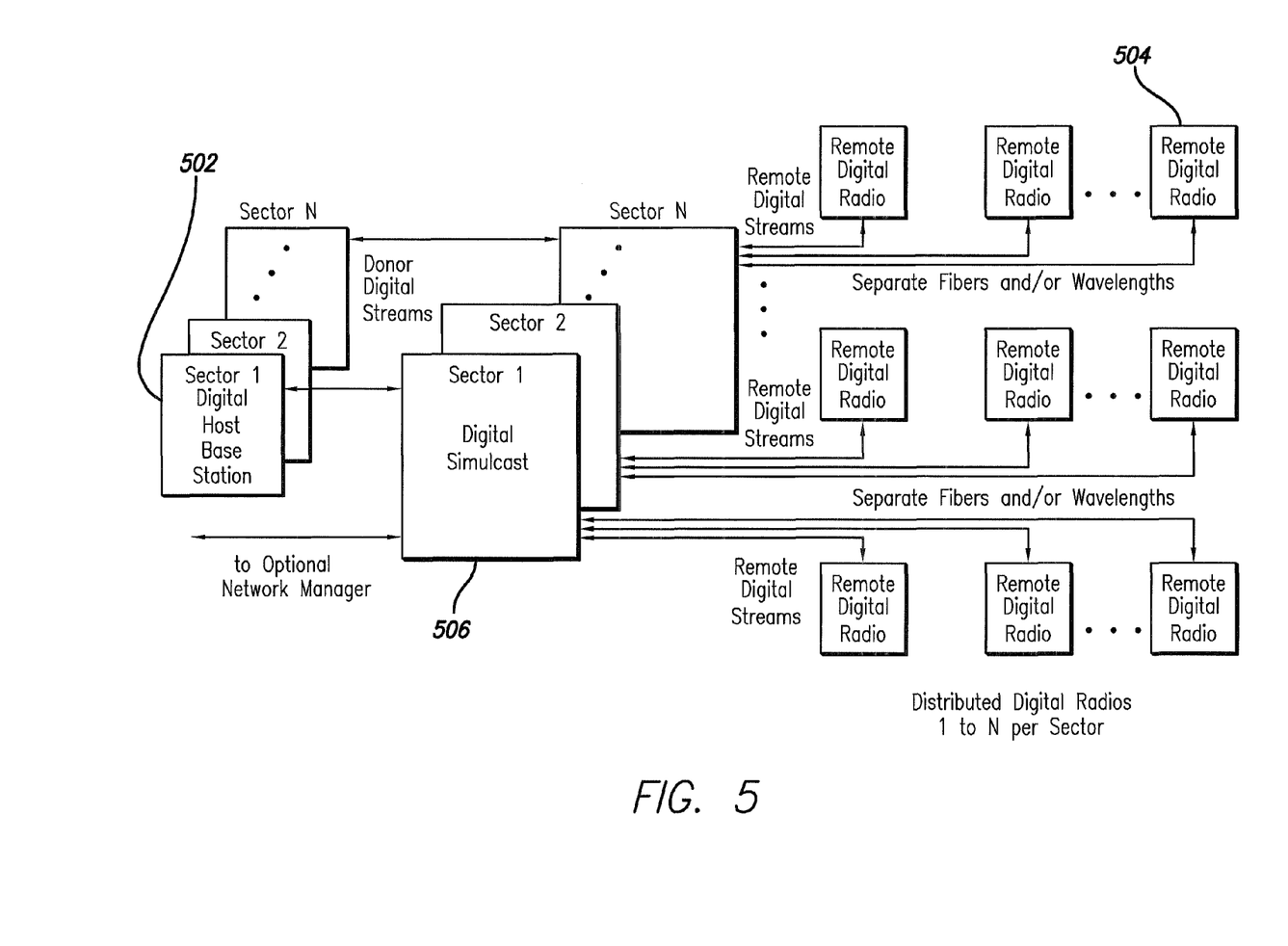
FIG. 5 is a block schematic drawing of a host digital base station and Digital Distributed Radio with Digital Distributed Hub scaled up in size to support multiple base station sectors according to another embodiment of the present invention.

FIG. 5 is a block schematic drawing illustrating a host digital base station and DDR with DDR Hub scaled up in size to support multiple base station sectors according to another preferred embodiment of the present invention.

As shown in FIG. 5, the DDR Hub 506 can be extended to multi-sector support through a simple replication of the single-sector DDR Hub 310 in FIG. 4. In FIG. 5, each sector is treated as a separate grouping of remote units with their associated base station sector. In all cases, there is a 1:1 connection from the DDR Hub 506 to the DDRs 504 over either separate fibers or separate wavelengths on a common fiber. The system may be either constructed from multiple copies of one sector DDR Hubs or be a single common, larger capacity DDR Hub. The latter may then share resources, such as the C&M element processor 316 for cost and space savings. In this case, all allocations of remote units 504 to base station sectors 502 are static.

Figure 6:
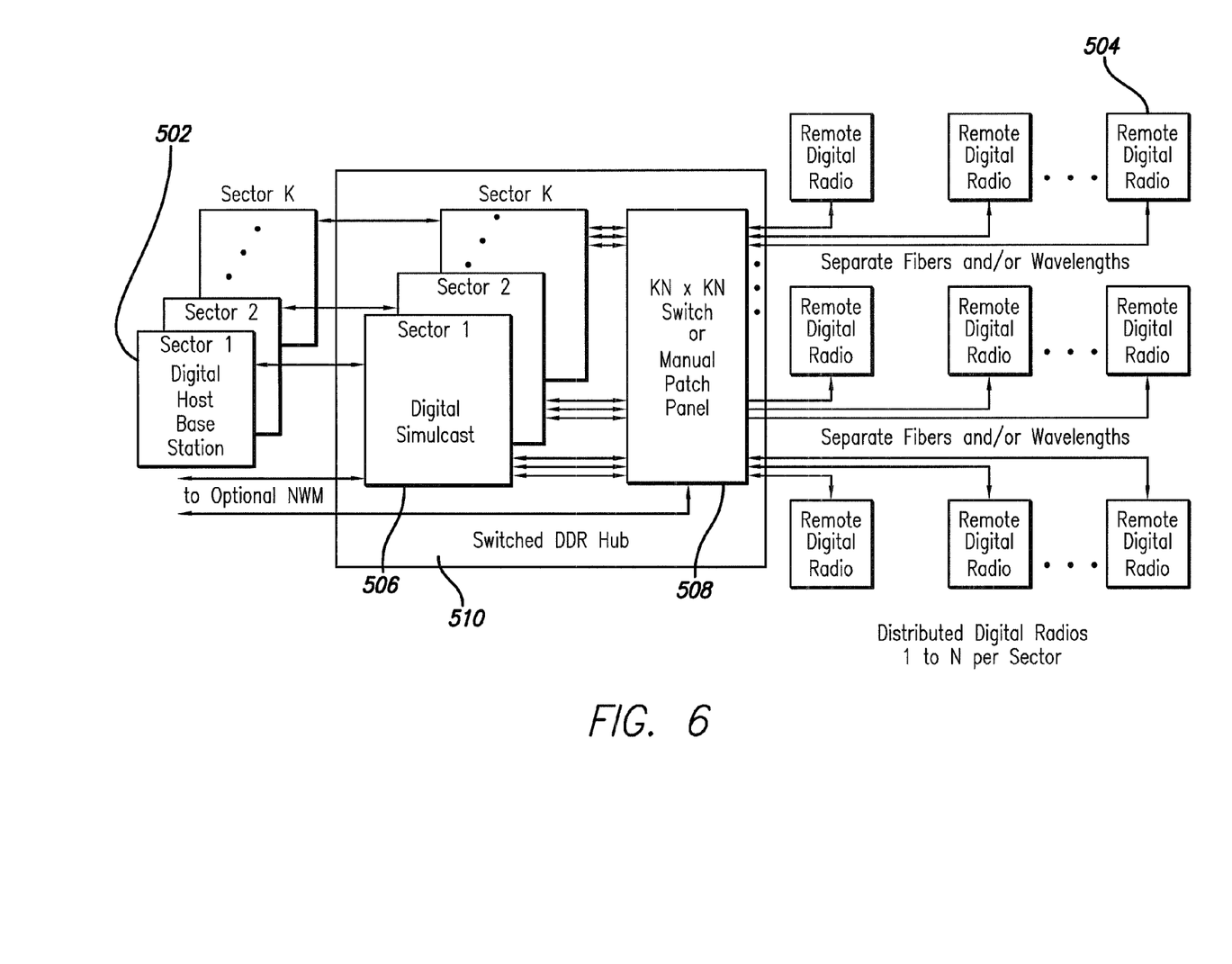
FIG. 6 is a block schematic drawing of a host digital base station and Digital Distributed Radio with the addition of a digital switch to a multiple base station sector DDAS to provide capacity reallocation capability to the network.

FIG. 6 is a block schematic drawing of a host digital base station 502 and remote DDR 504 with the addition of a switched DDR Hub 510 to a multiple base station sector DDAS to provide capacity reallocation capability to the network, according to another embodiment of the present invention.

FIG. 6 shows an expansion of the multi-sector DDR Hub 510 configuration from a static arrangement to a fully switch-capable arrangement. To utilize this switch capability, neither the DDRs 504 nor the DDR Hub 506 needs to change. The switch capability is an appliqué to the existing DDR hub configuration. By way of example, the switch capability can take two forms. The simplest embodiment is a manual patch panel 508 that allows the operator to reconfigure the connection between the DDRs 504 and the base station 502 as needed to fulfill capacity requirements. Any single DDR 504 can be connected to any base station sector 502 with the only constraint being the maximum simulcast per sector that is supported by the switched DDR Hub 510. This allows the operator to set up an initial capacity allocation on best a priori information and later still be able to redistribute capacity should any sector become overloaded.

Alternatively, the manual patch panel 508 can be replaced with a fully programmable electronic switch. The electronic switch embodiment eliminates the need for the operator to visit the DDR hub 506 to make capacity changes. Through IP connections, connectivity between the DDRs 504 and multiple base stations 502 can be changed remotely. The remote switching capability allows the operator to redistribute capacity in the following manner:

Manually reassign as needed to deal with long-term capacity changes.
 Timed reassignments based on historical capacity needs on a daily or hourly basis.
 Eventual automatic capacity-driven reassignments to allow the DDRs to adapt to capacity loads dynamically.

As will be appreciated by those skilled in the art, from the above disclosure the invention provides a number of features and advantages by incorporating simulcast techniques to digital distributed radio equipment. Specifically, in a preferred embodiment it is applied within the digital transport protocol between the base station and the remote radio electronics while resolving any ambiguities that can be generated by having a 1:N relationship between the donor base station interface and that of the remote digital radios. This invention also discloses a method to resolve time delay and control/management issues arising from having multiple remote units connected to each digital RF carrier in the host base station.

The present invention is distinguished from adding a simulcast DAS at the user side of the remote radio which defeats the benefit of allowing the digital radio to be placed directly within the coverage area. This invention also differs from demultiplexing multiple airlinks from a composite digital interface and sending individual airlinks to only one remote unit. Unlike simulcast, demultiplexing does not reduce handoff, frequency reuse, or PN offset reuse considerations.

The foregoing description of preferred embodiments is presented for purposes of illustration and description. Furthermore, the description is not intended to limit the invention to the form disclosed herein. Accordingly, variants and modifications consistent with the following teachings, and skill and knowledge of the relevant art, are within the scope of the present invention. The embodiments described herein are further intended to explain modes known for practicing the invention disclosed herewith and to enable others skilled in the art to utilize the invention in equivalent, or alternative embodiments and with various modifications considered necessary by the particular application(s) or use(s) of the present invention.

What is claimed is:

1. A digital distributed wireless communication system, comprising:
    a base station providing and receiving a full duplex digital multiplexed communication signal comprising a donor digital multiplexed communication signal and a remotes digital multiplexed communication signal;
    a plurality of remote transceiver units transmitting a plurality of digital multiplexed signals, wherein each of the plurality of remote transceiver units transmits a corresponding one of the plurality of digital multiplexed signals;
    a digital distributed interface unit coupled to the base station and the plurality of remote transceiver units providing the donor digital multiplexed communication signal in a 1:N simulcast distribution to, and providing time alignment of the plurality of digital multiplexed signals from, the plurality of remote transceiver units and providing the remotes digital multiplexed communication signal to the base station;
    a Control & Management (C&M) processor for processing C&M data plane provided to the plurality of remote transceiver units, wherein the C&M processor is arranged to aggregate by arithmetic summation the plurality of digital multiplexed signals from the plurality of remote transceiver units into a single combined reverse-link signal for transmission as the remotes digital communication signal from the digital distributed interface unit to the base station; and
    a plurality of fiber optic digital interface links, wherein each of the plurality of remote transceiver units has a corresponding single fiber optic digital interface link of the plurality of fiber optic digital interface links, wherein each of the plurality of remote transceiver units receives the donor digital multiplexed communication signal and transmits a corresponding one of the plurality of digital multiplexed signals on a corresponding single fiber optic digital interface link.

2. The digital distributed wireless communication system of claim 1, wherein the digital distributed interface unit manages a remote digital interface delay to align the plurality of digital multiplexed signals from the plurality of remote transceiver units.

3. The digital distributed wireless communication system of claim 1, wherein each of the plurality of remote transceiver units comprises a programmable delay to equalize propagation time to the digital distributed interface unit.

4. The digital distributed wireless communication system of claim 1, wherein the digital distributed interface unit provides control commands to each of the plurality of remote transceiver units.

5. The digital distributed wireless communication system of claim 1, wherein the full duplex digital multiplexed communication signal is a Common Public Radio Interface (CPRI) Open Basestation Architecture Initiative (OBSAI) signal.

6. The digital distributed wireless communication system of claim 1, wherein the plurality of remote transceiver units are Digital Distributed Radio (DDR) units providing an airlink to remote users.

7. A digital distribution communication network, comprising:
    a host digital base station providing and receiving a full duplex digital multiplexed communication signal comprising a donor digital multiplexed communication signal and a remotes digital multiplexed communication signal;
    a plurality of digital distributed radio (DDR) remotes coupled to receive the donor digital multiplexed communication signal from the host digital base station and to transmit a plurality of digital multiplexed signals, wherein each of the plurality of DDR remotes transmits a corresponding one of the plurality digital multiplexed signals; and
    a DDR Hub configured to provide a 1:N simulcast of the full duplex digital multiplexed communication signal to and from the plurality of DDR remotes, the DDR Hub coupled to the host digital base station and to each of the plurality of DDR remotes, wherein the DDR Hub comprises:
    a multiplexer coupled to the host digital base station;
    a plurality of fiber optic digital interface links coupled to plurality of DDR remotes and wherein a corresponding one of the plurality of fiber optic digital interface links is coupled to a corresponding one of the plurality of DDR remotes, wherein each corresponding one of the plurality of fiber optic digital interface links provides the donor digital multiplexed communication signal to a corresponding one of the plurality of DDR remotes and provides to the multiplexer the corresponding one of the plurality digital multiplexed signals from a corresponding one of the plurality of DDR remotes;
    a Control and Management (C&M) processor for processing C&M data plane from both the host digital base station and the plurality of DDR remotes and managing simulcast distribution of the C&M data plane to the plurality of DDR remotes, wherein the C&M processor is arranged to aggregate by arithmetic summation the plurality of digital multiplexed signals from the plurality of DDR remotes into a single combined reverse-link signal for transmission as the remotes digital multiplexed communication signal to the host digital base station; and a user plane processor for implementing summation and splitting operations, and providing a programmable delay for providing a common delay value to the donor digital multiplexed communication signal to, and the plurality of digital multiplexed signals from, the plurality of DDR remotes.

8. The digital distribution communication network of claim 7, wherein the DDR hub manages a remote digital interface delay to align the plurality of digital multiplexed signals from the plurality of DDR remotes.

9. The digital distribution communication network of claim 7, wherein each of the plurality of DDR remotes comprises a programmable delay for equalizing propagation times for all of the plurality of DDR remotes to the DDR Hub.

10. The digital distribution communication network of claim 7, wherein the full duplex digital multiplexed communication signal is a Common Public Radio Interface (CPRI) signal.

11. A method for providing a digital communication signal between a digital base station and a plurality of remote transceiver units, the method comprising:

providing and receiving a full duplex digital multiplexed communication signal at a digital base station via a digital distributed interface unit, wherein the full duplex digital multiplexed communication signal comprises a donor digital multiplexed communication signal and a remotes digital multiplexed communication signal;

processing the full duplex digital multiplexed communication signal for controlled distribution of a 1:N simulcast distribution of the full duplex digital multiplexed communication signal to and from a plurality of remote transceiver units, wherein the plurality of remote transceiver units transmits a plurality of digital multiplexed signals, wherein each of the plurality of remote transceiver units transmits a corresponding one of the plurality of digital multiplexed signals;

coupling the plurality of digital multiplexed signals to a plurality of fiber optic digital interface links, wherein each of the plurality of remote transceiver units has a corresponding single fiber optic digital interface link of the plurality of fiber optic digital interface links, wherein each of the plurality of remote transceiver units receives the donor digital multiplexed communication signal and transmits a corresponding one of the plurality of digital multiplexed signals on a corresponding single fiber optic digital interface link;

processing Control & Management (C&M) data plane from both the digital base station and the plurality of remote transceiver units, including by aggregating by arithmetic summation the plurality of digital multiplexed signals from the plurality of remote transceiver units into a single combined reverse-link signal for transmission as the remotes digital multiplexed communication signal to the digital base station; and managing simulcast distribution of the C&M data plane to the plurality of remote transceiver units, wherein the digital distributed interface unit manages a remote digital interface delay to align the plurality of digital multiplexed signals from the plurality of remote transceiver units.

12. The method of claim 11, wherein each of the plurality of remote transceiver units comprises a programmable delay to equalize propagation time to the digital distributed interface unit.

13. The method of claim 11, wherein the full duplex digital multiplexed communication signal is a Common Public Radio Interface (CPRI) or Open Basestation Architecture Initiative (OBSAI) signal.

14. The method of claim 11, wherein the plurality of remote transceiver units provide airlink transmissions to and from remote users.

15. The method of claim 11, further comprising commanding each of the plurality of remote transceiver units via a set of remote Common Public Radio Interface (CPRI) or Open Basestation Architecture Initiative (OBSAI) commands transmitted via the corresponding one of the plurality of fiber optic digital interface links.

* * * * *